US008559887B2

(12) United States Patent
Stager et al.

(10) Patent No.: US 8,559,887 B2
(45) Date of Patent: Oct. 15, 2013

(54) COHERENCE TIME ESTIMATION AND MOBILITY DETECTION FOR WIRELESS CHANNEL

(75) Inventors: Paul J. Stager, Akron, OH (US); Matthew A. Silverman, Richfield, OH (US); Srikant Kuppa, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 651 days.

(21) Appl. No.: 12/792,368

(22) Filed: Jun. 2, 2010

(65) Prior Publication Data
US 2011/0009071 A1   Jan. 13, 2011

Related U.S. Application Data

(60) Provisional application No. 61/224,330, filed on Jul. 9, 2009.

(51) Int. Cl.
*H04B 17/00* (2006.01)
(52) U.S. Cl.
USPC ........................... 455/67.16; 455/67.11
(58) Field of Classification Search
USPC ..................... 455/67.16, 455, 67.11
See application file for complete search history.

(56) References Cited

U.S. PATENT DOCUMENTS

| | | | |
|---|---|---|---|
| 6,680,967 B1 * | 1/2004 | Westman | 375/148 |
| 6,711,412 B1 * | 3/2004 | Tellado et al. | 455/506 |
| 7,620,423 B2 | 11/2009 | Jin et al. | |
| 7,978,784 B2 | 7/2011 | Zhang et al. | |
| 8,238,404 B2 * | 8/2012 | Vaidyanathan et al. | 375/132 |
| 8,249,026 B2 * | 8/2012 | Barrett | 370/332 |
| 2002/0105928 A1 * | 8/2002 | Kapoor et al. | 370/334 |
| 2002/0159534 A1 * | 10/2002 | Duncan et al. | 375/260 |
| 2003/0053523 A1 | 3/2003 | Xu | |
| 2003/0072395 A1 * | 4/2003 | Jia et al. | 375/341 |
| 2003/0193992 A1 * | 10/2003 | Challa et al. | 375/147 |
| 2003/0201935 A1 * | 10/2003 | King et al. | 342/357.15 |
| 2003/0211831 A1 | 11/2003 | Xu et al. | |
| 2004/0146024 A1 | 7/2004 | Li et al. | |
| 2005/0152314 A1 * | 7/2005 | Sun et al. | 370/334 |
| 2005/0287962 A1 * | 12/2005 | Mehta et al. | 455/101 |
| 2006/0019602 A1 * | 1/2006 | Ionescu et al. | 455/10 |
| 2007/0010203 A1 | 1/2007 | Wee et al. | |
| 2007/0286303 A1 | 12/2007 | Yamaura | |

(Continued)

OTHER PUBLICATIONS

"Wi-Fi Certified™ 802.11n Draft 2.0: Longer-Range, Faster Throughput, Multimedia-Grade Wi-Fi® Networks", 2007 Wi-Fi Alliance, pp. 1-18.

(Continued)

*Primary Examiner* — Nay A Maung
*Assistant Examiner* — Erica Fleming-Hall
(74) *Attorney, Agent, or Firm* — Edell, Shapiro & Finnan, LLC

(57) ABSTRACT

Techniques are provided to measure how fast a wireless channel is changing between a first wireless communication device (e.g., a wireless base station or access point) and a second wireless device (e.g., a wireless client device) based on signals that the first communication wireless device receives at a plurality of antennas from a second wireless communication device. Techniques are also provided to measure a degree of mobility of the second wireless communication device based on signals received at the first communication wireless device from the second communication wireless device.

25 Claims, 8 Drawing Sheets

(56) References Cited

U.S. PATENT DOCUMENTS

| | | |
|---|---|---|
| 2008/0101489 A1 | 5/2008 | Wang et al. |
| 2008/0102898 A1* | 5/2008 | Na et al. ................ 455/562.1 |
| 2008/0113624 A1* | 5/2008 | Seidel et al. ............ 455/67.13 |
| 2008/0137718 A1* | 6/2008 | Cha et al. .................... 375/146 |
| 2008/0139127 A1* | 6/2008 | Suwansantisuk et al. . 455/67.16 |
| 2008/0146262 A1* | 6/2008 | Schwoerer et al. ........... 455/500 |
| 2008/0159455 A1 | 7/2008 | Wang et al. |
| 2008/0164996 A1* | 7/2008 | Coronel et al. ............. 340/539.1 |
| 2009/0042618 A1 | 2/2009 | Hedayat et al. |
| 2009/0051594 A1 | 2/2009 | Na et al. |
| 2009/0080560 A1 | 3/2009 | Na et al. |
| 2009/0190691 A1* | 7/2009 | Ariyavisitakul et al. ..... 375/295 |
| 2009/0213943 A1* | 8/2009 | Gu et al. ..................... 375/260 |
| 2009/0225813 A1* | 9/2009 | Im ............................... 375/141 |
| 2009/0234618 A1* | 9/2009 | Taenzer et al. ............. 702/189 |
| 2009/0315762 A1* | 12/2009 | Venkatachalam et al. .. 342/26 R |
| 2009/0322614 A1 | 12/2009 | Na et al. |
| 2009/0323847 A1 | 12/2009 | Na et al. |
| 2010/0014504 A1* | 1/2010 | Sun et al. ..................... 370/345 |
| 2010/0087151 A1* | 4/2010 | Auer .......................... 455/67.11 |
| 2010/0202418 A1* | 8/2010 | Barrett ........................ 370/336 |
| 2010/0255790 A1* | 10/2010 | Farajidana et al. ............ 455/69 |
| 2010/0266004 A1* | 10/2010 | Aoki et al. ................... 375/226 |
| 2010/0284480 A1* | 11/2010 | Jia et al. ....................... 375/260 |
| 2011/0051636 A1 | 3/2011 | Van Nee et al. |
| 2011/0268215 A1 | 11/2011 | Khojastepour |
| 2011/0293040 A1* | 12/2011 | Dupont et al. ............... 375/316 |

OTHER PUBLICATIONS

"802.11n: The Standard Revealed", 2009 Cisco Systems Inc., pp. 1-23.

* cited by examiner

COHERENCE TIME ESTIMATION AND MOBILITY DETECTION FOR WIRELESS CHANNEL

RELATED APPLICATION

This application claims priority to U.S. Provisional Application No. 61/224,330, filed Jul. 9, 2009, the entirety of which is incorporated herein by reference.

TECHNICAL FIELD

The present disclosure relates to channel estimation techniques used by a wireless communication device.

BACKGROUND

Channel coherence time describes the average rate at which the wireless channel varies. Knowledge of the channel coherence time or the detection of a sudden change in the channel state may be used to improve the efficacy of several functions in a wireless system.

Beamforming techniques require updated information within the channel coherence time to improve transmission performance over a wireless link. Beamforming in a wireless channel requires knowledge of the channel at the transmitting device. The knowledge of the channel is to be applied to a beamformed signal within the channel coherence time; otherwise stale beamforming information may result in degraded performance on the wireless link. On the other hand, if beamforming information is obtained and updated at a rate much faster than the channel coherence time, valuable system processing resources are used while the same benefit to the wireless link could be achieved with fewer system processing resources.

The coherence time estimates are used to set the stale-out time of beamforming information and/or optimize the update rate of the beamforming weights to conserve system resources. A rate-selection algorithm is designed to converge to the optimal rate supported by the channel; the optimal bandwidth of the rate-selection loop or hysteresis is a function of the channel coherence time. In addition, wireless synchronization requires frame exchanges within the channel coherence interval. Channel coherence measurements may be used to filter measurement data obtained outside that interval or to set frame exchange parameters in synchronization measurements.

There are other application of channel coherence measurements that are useful to improve performance in a wireless communication system.

DESCRIPTION OF EXAMPLE EMBODIMENTS

Overview

Techniques are provided to measure how fast a wireless channel is changing between a first wireless communication device (e.g., a wireless base station or access point) and a second wireless device (e.g., a wireless client device) based on signals that the first communication wireless device receives at a plurality of antennas from a second wireless communication device. At the first wireless communication device, transmissions are received at a plurality of antennas from a second wireless communication device. A corresponding plurality of antenna-specific receive signals is generated from each transmission received at the plurality of antennas. A channel estimate for a channel between the first wireless communication device and the second wireless communication device is computed from the antenna-specific receive signals. A channel observation parameter is computed from the channel estimate, where the channel observation parameter represents conditions of the channel at a time instance based on a received transmission. The channel observation parameter computed for each of a plurality of transmissions received over time is stored at the first wireless communication device. Data representing differences between the channel observation parameters stored for combinations of pairs of the plurality of transmissions received over time are computed. The data representing the differences are stored in bins sorted by time interval between time of reception of the pairs of transmissions used to compute the respective differences. An estimate of the coherence time of the channel is generated based on a distribution of the data representing the differences stored in the bins. Techniques are also provided to detect movement (e.g., mobility) of the second wireless communication device based on signals received at the first wireless communication device from the second communication wireless device.

Figure 1:
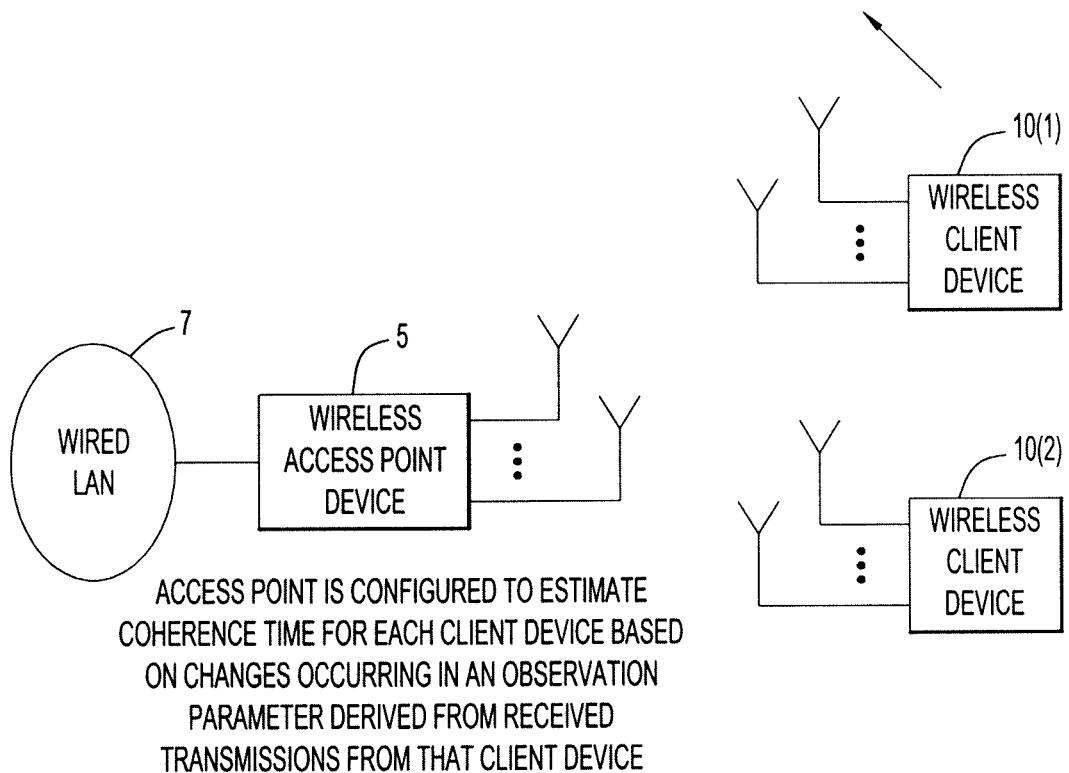
FIG. 1 is an example of a wireless communication system in which a first wireless communication device, e.g., a wireless access point device, is configured to estimate channel coherence time for a wireless channel with respect to a second wireless communication device, e.g., a wireless client device, based on changes in a channel observation parameter derived from received transmissions from a client device.

Referring first to FIG. 1, a diagram is shown of a wireless communication system or network comprising a wireless access point (AP) device 5 that wirelessly communicates with a plurality of wireless client devices (CDs) 10(1)-10(Z). The AP 5 connects to a wired local area network (LAN) shown at reference numeral 7. The AP 5 communicates with the CDs 10(1)-10(Z) using a wireless communication protocol, such as an IEEE 802.11 wireless communication protocol. The AP 5 may be referred to herein as a first wireless communication device and any one of the CDs is referred to herein as a second wireless communication device.

The AP 5 is generally fixed or stationary, whereas the CDs 10(1)-10(Z) may be stationary or mobile. For example, the arrows associated with CDs 10(1) and 10(Z) indicate that these two CDs are in motion. The AP 5 is configured to estimate a channel coherence time for each CD that it serves based on changes that the AP determines to be occurring in an observation parameter derived from transmissions (packets or frames) that the AP receives from a given CD. Techniques for estimating the channel coherence time are described hereinafter in connection with FIGS. 3-6. In addition, the AP is configured to estimate a degree of mobility of a CD according to techniques described hereinafter in connection with FIGS. 7-9.

The channel coherence time describes the average rate at which the wireless channel varies. In other words, the channel coherence time is the time interval within which the wireless channel does not vary, or varies by an insignificant amount.

Figure 2:
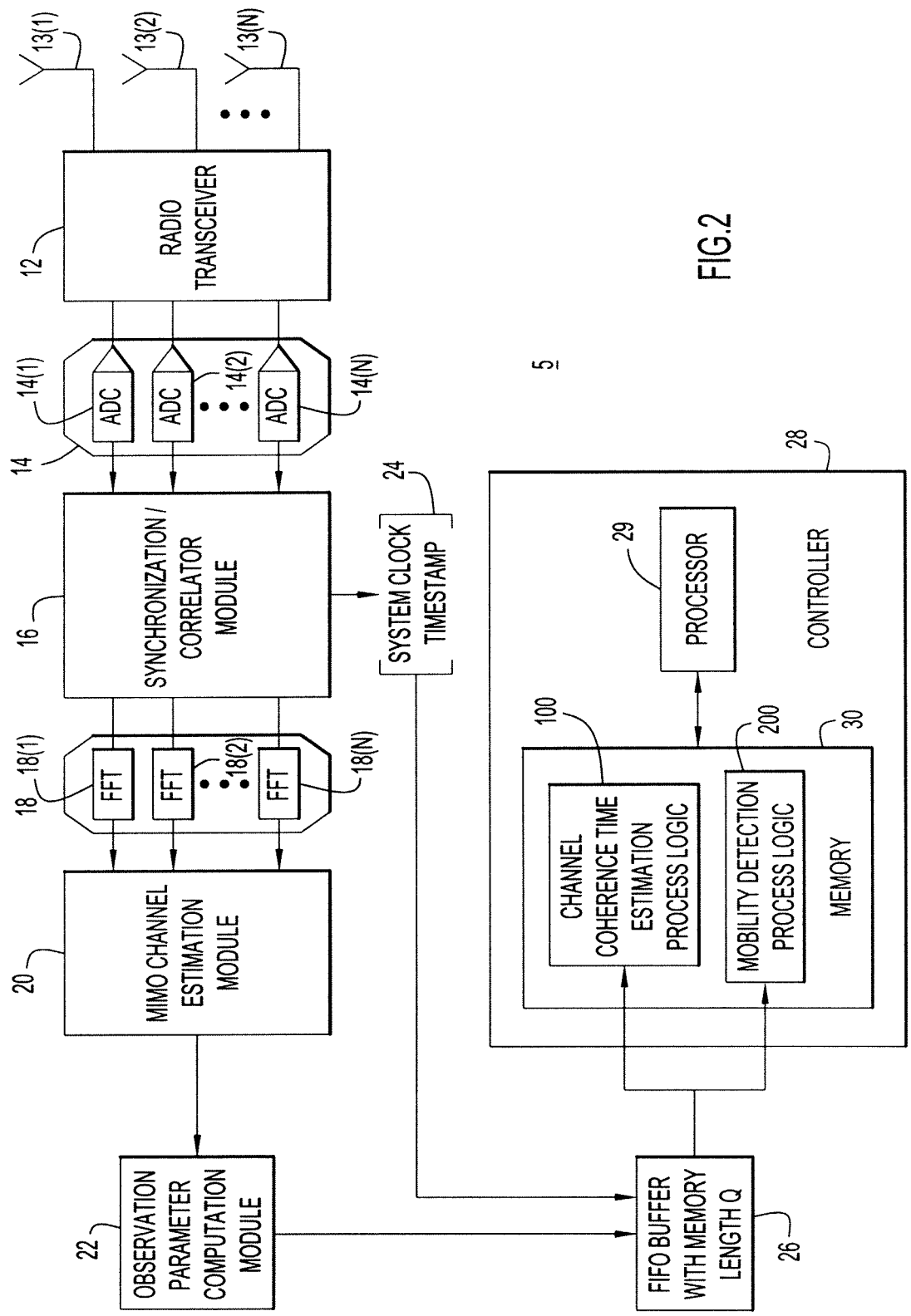
FIG. 2 is an example of a block diagram of a wireless communication device, e.g., a wireless access point device, configured to perform a channel coherence time estimation process and a mobility detection process according to the techniques described herein.

FIG. 2 shows a block diagram of a wireless communication device, e.g., AP 5, configured to perform the coherence time estimation and mobility detection techniques. The device comprises a radio transceiver 12 (that has receive and transmit capabilities) that is configured to transmit signals and receive signals via a plurality of antennas 13(1)-13(N). A block 14 of analog to digital converters (ADCs) 14(1)-14(N) is provided, one ADC for each baseband receive signal produced by the radio transceiver 12 for a signal received by a corresponding one of the antennas 13(1)-13(N). The radio transceiver 12 generates analog antenna-specific receive signals corresponding to reception of a transmission at the plurality of antennas 13(1)-13(N). The ADCs convert the analog antenna-specific received signals from corresponding ones of the antennas 13(1)-13(N) to corresponding digital signals.

A synchronization/correlator 16 is provided to detect and correlate to a preamble of a received transmission (frame). A block 18 of Fast Fourier Transform (FFT) modules 18(1)-18(N) is provided, an FFT module for each baseband antenna-specific receive signal. Each FFT module 18(1)-18(N) is configured to convert a corresponding (digital) antenna-specific baseband receive signal to a frequency domain signal representation.

A multiple-input multiple-output (MIMO) channel estimation module 20 is coupled to the outputs of the FFT module block 18. The MIMO channel estimate module 20 is configured to analyze the frequency domain signals produced by the FFT module block 18 to generate information related to a channel estimate for the over-the-air wireless radio channel between the AP and a CD from which the AP is receiving signals. The channel estimate is a matrix denoted $\hat{H}$. The channel estimate matrix $\hat{H}$ is in general an N×M matrix, where N is the number of antennas at the AP and M is the number of antennas at the CD. There are numerous techniques for computing the channel estimate matrix $\hat{H}$. For example, the 802.11 wireless communication protocol standards specify techniques for computing the channel estimate matrix $\hat{H}$. The channel estimate matrix $\hat{H}$ comprises data for each of a plurality of subcarriers in the case of an orthogonal frequency divisional multiplexed (OFDM) communication protocol. The channel estimate information at each of the subcarriers is derived from the output of the FFT module 18.

An observation parameter computation module 22 is provided that is configured to compute at least one channel observation parameter from the channel estimate matrix. The channel observation parameter represents conditions of the channel at a time instance from a received transmission. Examples of the observation parameters computed by the module 22 include a co-phase angle, transmit beamforming vector, and an eigenvector corresponding to a largest eigenvalue of the channel estimate matrix $\hat{H}$ or of $\hat{H}^H\hat{H}$ (where $^H$ denotes the Hermitian operation). The eigenvector computed according to either of these techniques may also be used for the transmit beamforming vector. There are other techniques known to compute the transmit beamforming vector from a channel estimate matrix. A measure of the coherence time of the channel between the AP and a given CD is generated from the at least one channel observation parameter over a period of time associated with reception of a plurality of transmissions (packets) from a given CD. In addition, an indication of mobility detection of a CD with respect to the AP is made using the channel observation parameter.

A first-in first-out (FIFO) memory buffer 26 of length Q is provided to store data for the channel observation parameter computed by the module 22 for each of a plurality of transmissions (packets) received by the AP from a given CD. The synchronization/correlator module 16 provides carrier sense detection and a system clock timestamp shown at 24. The system clock time-stamp 24 is supplied to the memory 26 to store a timestamp associated with the reception of a transmission for which a channel observation parameter is computed and stored in the buffer 26.

A controller 28 is provided that comprises a memory 30 to store data used for the various computations described herein. In addition, the controller 28 is configured with coherence time estimation algorithm logic 100 and mobility detection algorithm logic 200. The memory 30 is a tangible computer readable memory medium that stores or is encoded with software instructions for the coherence time estimation process logic 100 and mobility detection process logic 200. A processor 29 executes the instructions stored in the memory 30, including the instructions for the coherence time estimation process logic 100 and mobility detection process logic 200, to perform the operations described herein. The processor 29 is, for example, a microprocessor, microcontroller or digital signal processor.

The process logic 100 and 200 may take any of a variety of forms, so as to be encoded in one or more tangible media for execution, such as with fixed logic or programmable logic (e.g., software/computer instructions executed by a processor). Moreover, the processor 29 may be a programmable processor, programmable digital logic (e.g., field programmable gate array) or an application specific integrated circuit (ASIC) that comprises fixed digital logic, or a combination thereof.

Furthermore, the ADC module 14, synchronization/correlator module 16, FFT module 18, MIMO channel estimation module 20 and the observation parameter computation module 22 may be implemented by hardware (digital logic gates). In another form, the operations of one or more of these modules may be implemented by instructions stored in the memory 30, that, when executed by the processor 29, cause the processor 29 to perform their respective operations described herein, e.g., to compute the channel estimate matrix $\hat{H}$ and the channel observation parameter. In other words, the controller 30 may perform the operations to generate the channel estimate matrix $\hat{H}$ and the channel observation parameter, as well as the operations associated with the process logic 100 and process logic 200.

The Channel Coherence Time Estimation Process

Figure 3:
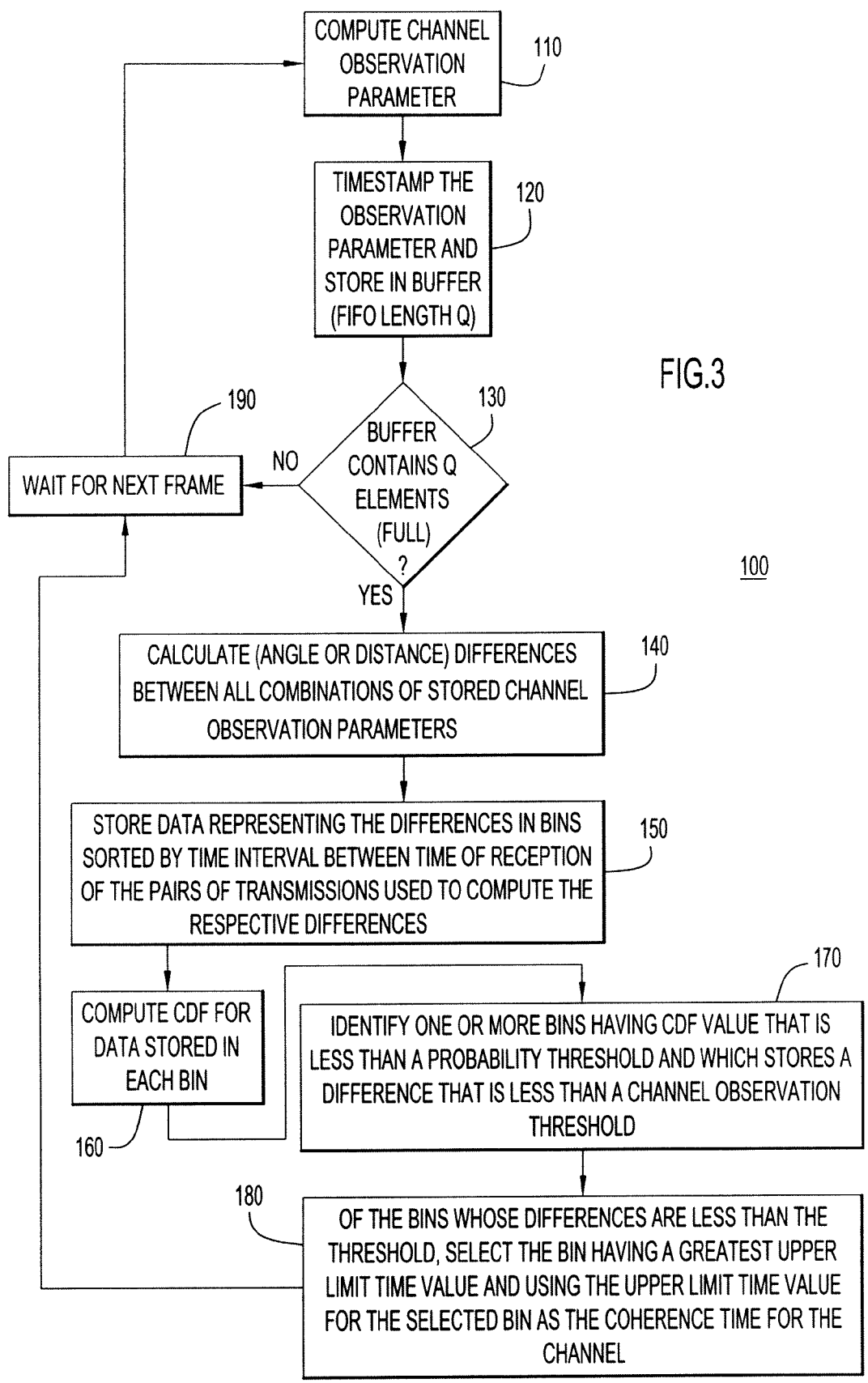
FIG. 3 is an example of a flow chart for the channel coherence time estimation process.

The coherence time estimation process logic 100 is now described with reference to the flow chart of FIG. 3, the diagram of FIG. 4 and the plots in FIGS. 5 and 6.

As shown at 110 (and the "wait for next frame" operation 190), whenever a transmission (e.g., packet or frame) is received at a first device, e.g., at the AP, from a second device, e.g., a CD, in a normal beamforming packet exchange, a location process, or even an exchange that occurs between multiple APs for purposes of clock synchronization, at least one channel observation parameter is computed (by the channel observation parameter computation module 22) for the received transmission.

As explained above, examples of the observation parameters computed by the module 22 include a co-phase angle, transmit beamforming vector, and an eigenvector corresponding to an eigenvalue (e.g., largest eigenvalue, smallest eigenvalue, a middle eigenvalue or multiple eigenvalues) of the channel estimate matrix $\hat{H}$ or of $\hat{H}^H\hat{H}$ (where $^H$ denotes the Hermitian operation). The co-phase angle information is obtained from the per subcarrier channel estimates obtained for each received frame and is particularly useful when the CD has a single antenna, in which case the N×M channel estimate matrix $\hat{H}$ is an N×1 vector. In this case, and when the AP has two antennas (N=2), the channel estimate matrix $\hat{H}$ is given by:

$$\hat{H} = \begin{bmatrix} \hat{h}_1 \\ \hat{h}_2 \end{bmatrix}.$$

The co-phase angle is the angle difference between $\hat{h}_1$ and $\hat{h}_2$. If there are more than two antennas at the AP, then the angle difference would be computed with respect to one of the vectors, e.g., $\hat{h}_1$ and each of the other vectors in order to determine the co-phase angle.

The power gain curve of two-element co-phase beamforming is flat to 30 degrees of error in the co-phase beamforming angle. For a two-element transmit array, the constructive combining of transmit elements degrades rapidly past 30 degrees and is actually destructive at 90 degrees. For a transmit array with more than two antennas, the angle may be even less than 30 degrees. A measure of channel coherence for the purpose of co-phase beamforming can be obtained from the co-phase angle information. Consequently, the process 100 may use co-phase beamforming information computed for the purpose of updating co-phase beamforming weights as a measure of channel coherence. In the case where the channel observation parameter is co-phase angle, the process 100 seeks to answer: what minimum update rate is required to ensure that Z % of co-phase angle changes are less than X degrees?

When the eigenvector of the channel estimate matrix $\hat{H}$ or the eigenvector of $\hat{H}^H\hat{H}$ is used (which is particularly useful for an N×M channel, where N>2 and M>1), then the eigenvector computed from the channel estimate matrix $\hat{H}$ or from $\hat{H}^H\hat{H}$ for a given received transmission comprises data at each of a plurality of subcarriers.

Generally, the operation 110 performed by module 22 may produce any information or parameter related to or derived from the channel estimate that is invariant to synchronization differences at the AP. In this context, synchronization differences refer to the alignment of an FFT window on the received time domain sequence used in channel estimation.

When an uplink transmission (packet or frame) is received at the AP from a CD, a timestamp is associated with the reception of the packet and the channel observation parameter computed for that packet is stored, together with a timestamp associated with reception of the packet from which the channel observation parameter is computed, in the buffer memory 26 at operation 120. At 130, a determination is made as to whether the buffer memory 26 is full (i.e., whether the memory buffer 26 has Q elements stored in it).

Each uplink packet brings a new channel estimate that yields new channel observation parameter data. In the case of co-phasing angle information, a set of co-phasing angles, $\phi[n,k]$ is generated, where n is the sample time of arrival of the packet, and k is the subcarrier index, assuming that the transmitted signal received at the AP is formatted in accordance with signal format such as an OFDM signal format. With a buffer of length Q, $$L = \frac{Q!}{(Q-2)! * 2}$$

sets of $\Delta\phi[\Delta n^{i,j},k]$ are saved in the memory buffer 26, where, $\Delta\phi[n^{2,1},k]=\phi[n^2,k]-\phi[n^1,k]$ $n^{2,1}=n^2<n^1$. If the sampling period is static, with period $\Delta T$, then the time interval between received transmissions (packets) is $\Delta t^{2,1}=n^2\Delta T-n^1\Delta T$. In the case of eigenvectors being used for the channel observation parameter, then a set of vectors J[n,k] is generated, where n is the sample time of arrival of the packet, and k is the subcarrier index for an OFDM signal format.

After the buffer has captured Q updates of channel observation parameter data as determined at 130, then at 140, differences between the stored channel observation parameters for combinations of pairs of channel observation parameters (for the plurality of received transmissions) are computed. In the case where the channel observation parameter is co-phase angle values, M=L*K sets of $\Delta\phi[m]$ are computed at 140 for an associated $\Delta t[m]$, where K is the total number of subcarriers per packet and m is the memory index number from the memory buffer 26. Similarly, when the channel observation parameter is a vector (e.g., eigenvector or transmit beamforming vector), M=L*K sets of $\Delta J[m]$ are computed for an associated $\Delta t[m]$, where K is the total number of subcarriers per packet and m is the memory index number from the memory buffer 26, and where $\Delta J[m]$ is a distance, e.g., a Euclidean distance, between the vectors J[n,k] stored in the memory buffer 26.

At 150, data representing the differences, e.g., $\Delta\phi$ or $\Delta J$, are stored in data bins sorted by time interval between time of reception of the pairs of transmissions used to compute the respective differences. The data representing the differences are also referred to herein as difference values or difference data. Data defining the bins is generated such that each bin is dedicated to a different time interval length specified by a lower time limit value and an upper time limit value. These bins are also referred to as delta-time bins and each bin corresponds to a different length time interval. FIG. 4 shows an example of the arrangement of the data bins allocated by the processor 29 in memory 30. There are $N_{BINS-1}$ data bins labeled Bin 0, Bin 1, Bin 2, ..., Bin $N_{BINS-1}$. Bin 0 is allocated to store difference data computed for transmissions separated by a time difference $\Delta t[m]$ that is between $\Delta t^{t1}>\Delta t[m]>\Delta t^{t0}$, Bin 1 is allocated to store difference data computed for transmissions separated by a time difference $\Delta t[m]$ that is between $\Delta t^{t2}>\Delta t[m]>\Delta t^{t1}$ and so on.

Difference data join difference data, $\Delta J[m]$ or $\Delta\phi[m]$ from previously bin-assigned difference data from prior storage events ("buffer pushes"). For example, all $\Delta\phi[m]$ with an associated $\Delta t[m]$ such that $\Delta t^{t1}>\Delta t[m]>\Delta t^{t0}$ will be placed in Bin 0, all $\Delta\phi[m]$ with an associated $\Delta t[m]$ such that $\Delta t^{t2}>\Delta t[m]>\Delta t^{t1}$ will be placed in Bin 1, all $\Delta\phi[m]$ with an associated $\Delta t[m]$ such that $\Delta t^{t3}>\Delta t[m]>\Delta t^{t2}$ will be placed in Bin 2, and so on. This follows for all $N_{bins}$ so that the last bin is populated with $\Delta\phi[m]$ with an associated $\Delta t[m]$ such that $\Delta t^{tN_{Bins}}>\Delta t[m]>\Delta t^{tN_{Bins}-1}$, and where $\Delta t^{t0}<\Delta t^{t1}<\Delta t^{t2}\ldots<\Delta t^{tN_{Bins}}$, i.e., each delta-time bin has a different time interval length.

The value of $\Delta t^{tN_{Bins}}$ is limited by Q and $\Delta T$ such that, $\Delta t^{tN_{Bins}}\leq(Q-1)\Delta T$.

Since the newly computed difference data join difference data in the data bins from previous buffer pushes, the timestamp will also be associated with each difference data in order to allow for the deletion of older difference data in the data bins. This will ensure that the data bins represent the most recent information about the channel.

When the channel observation parameter is a co-phase (also referred to herein as co-phasing) angle, the co-phase angle is computed at each of a plurality of subcarriers for each received transmission from the channel estimate computed for the received transmissions at each of the plurality of subcarriers. Furthermore, the data representing the differences, for co-phase angle, is data representing differences between co-phase angles computed for each of the plurality of transmissions.

When the channel observation parameter is a vector (e.g., eigenvector or transmit beamforming vector), the vector is computed at each of a plurality of subcarriers for each received transmission from the channel estimate computed for the received transmissions at each of the plurality of subcarriers. Furthermore, the data representing the differences, for a vector, is data representing Euclidean distance between vectors (e.g., eigenvector or transmit beamforming vector) computed for each of the plurality of transmissions.

After every new set of difference data are added to the population within each bin, then at 160, cumulative distribution functions (CDFs) of the difference data are calculated for each bin.

At 170, one or more bins are identified having a CDF value that is less than a probability threshold and which stores difference data that is less than a channel observation threshold (either angle threshold for co-phase angles or distance threshold for Euclidean distance between vectors). For example, when the channel observation parameter is co-phase angle, one or more bins with a CDF that satisfies the following equation are identified: $P[\Delta\phi<X|\Delta t^{m-1}<\Delta t<\Delta t^m]=Z$, where Z is some probability threshold and X is an angle difference threshold that amounts to de-correlation of the channel. The equation basically states that there is a high probability, Z, that the angle difference in co-phase values, $\Delta\phi$, for updates separated by an amount of time within some range, $\Delta t^{m-1}<\Delta t<\Delta t^m$, will be less than some angle difference threshold, X. The value of X should be some angle difference that represents the point of de-correlation between the channels associated with the sets of co-phase values. This should be a value that is equal to the co-phase angle error associated with the maximum degradation on beamforming gain permitted, which is a design choice, but the co-phase error associated with the zero-gain point is an upper limit to this value. In the case of Euclidean distance between vectors is the data representing the differences when the channel observation parameter is a vectors, then at 170, the one or more bins are identified whose distances are less than or equal to some distance threshold d.

At 180, of the bins that satisfy the above criteria specified at 170, the bin with the greatest upper limit $\Delta t$ indicates the coherence time of the channel, and that upper $\Delta t$ limit of the bin is set as an estimate of the coherence time of the channel. In other words, at 180, of the bins whose difference data are less than the threshold, the bin associated with the longest length time interval is selected and the coherence time for the channel is set based on (e.g., equal to) the time interval length (the upper limit value) for the selected bin. FIG. 4 shows the upper limit time value for Bin 1 as an example. If Bin 1 were determined to satisfy the selection criteria used at operation 180, then the upper limit time value t2 would be used as the coherence time for the channel.

Figure 5:
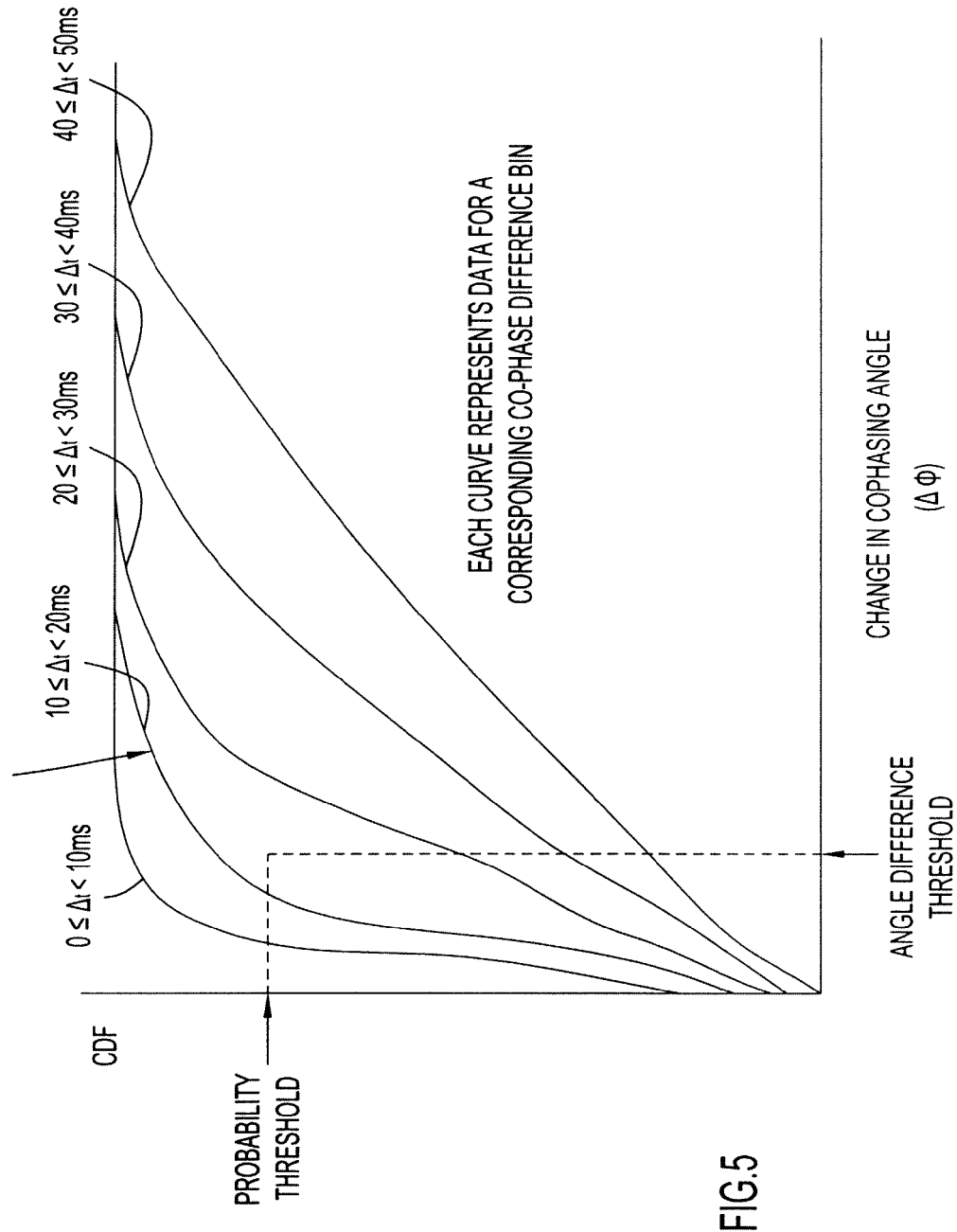
FIGS. 5 and 6 are examples of plots depicting operations of the channel coherence time estimation process.
Figure 6:
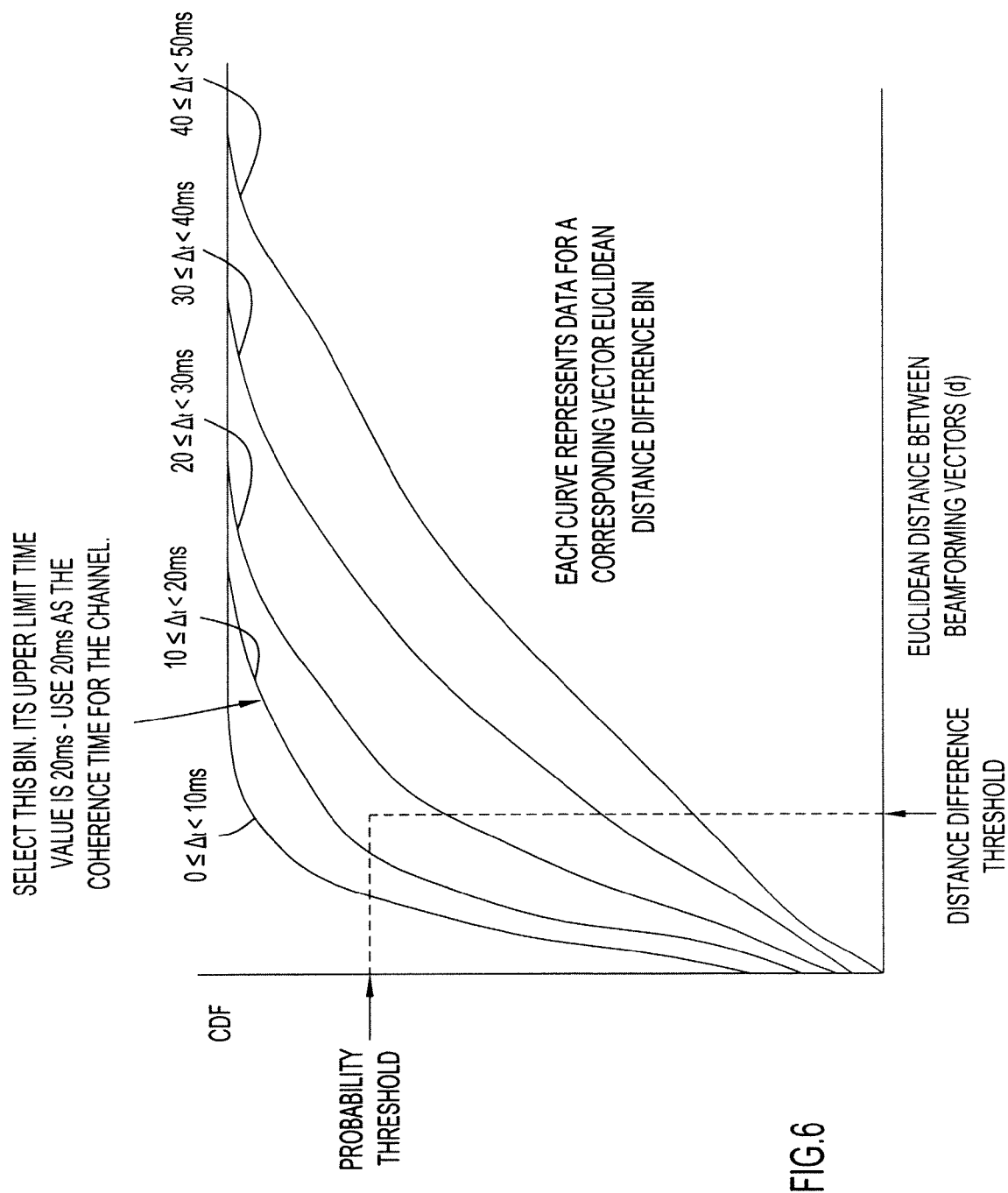

Reference is now made to FIGS. 5 and 6. FIG. 5 shows plots of CDF versus change in co-phase angle for several data bins as explained above in connection with operations 150-180. The data for each of a plurality of bins is represented by a corresponding one of the curves. The plots are made on a CDF vs. co-phase angle difference axis. A probability threshold of, e.g., 90%, is shown on the y-axis and a co-phase angle difference threshold, e.g., 30 degrees, is shown on the x-axis. A point is found where these two threshold values intersect. The closest bin (curve) that satisfies the condition that at least some percentage (probability threshold, e.g. 90%) of its difference data are less than the angle threshold (e.g., 30 degrees) contains the estimated coherence time, and the upper limit of that closest bin is used as the coherence time of the channel. The bin that satisfies this criteria in the example of FIG. 5 is the bin for the time interval 10 ms≤$\Delta t$<20 ms. 20 ms is the upper limit time value for this bin so 20 ms is used as the coherence time for the channel in this example.

FIG. 6 illustrates a similar arrangement for the case where the channel observation parameter is Euclidean distance associated with vectors used as the channel observation parameter. The upper limit time value of the bin that satisfies the criteria described above in connection with operation 180 is selected and in the example shown in FIG. 6 this is the bin for 10 ms≤$\Delta t$<20 ms. Again, 20 ms is the upper limit time value for this bin so 20 ms is used as the coherence time for the channel in this example.

While the foregoing describes that the comparison (at 170) is made to determine whether the difference data is less than a channel observation threshold (angle or Euclidean distance), this is only an example. A threshold may be set such that the comparison is made to determine whether the difference data is greater than the threshold.

Figure 4:
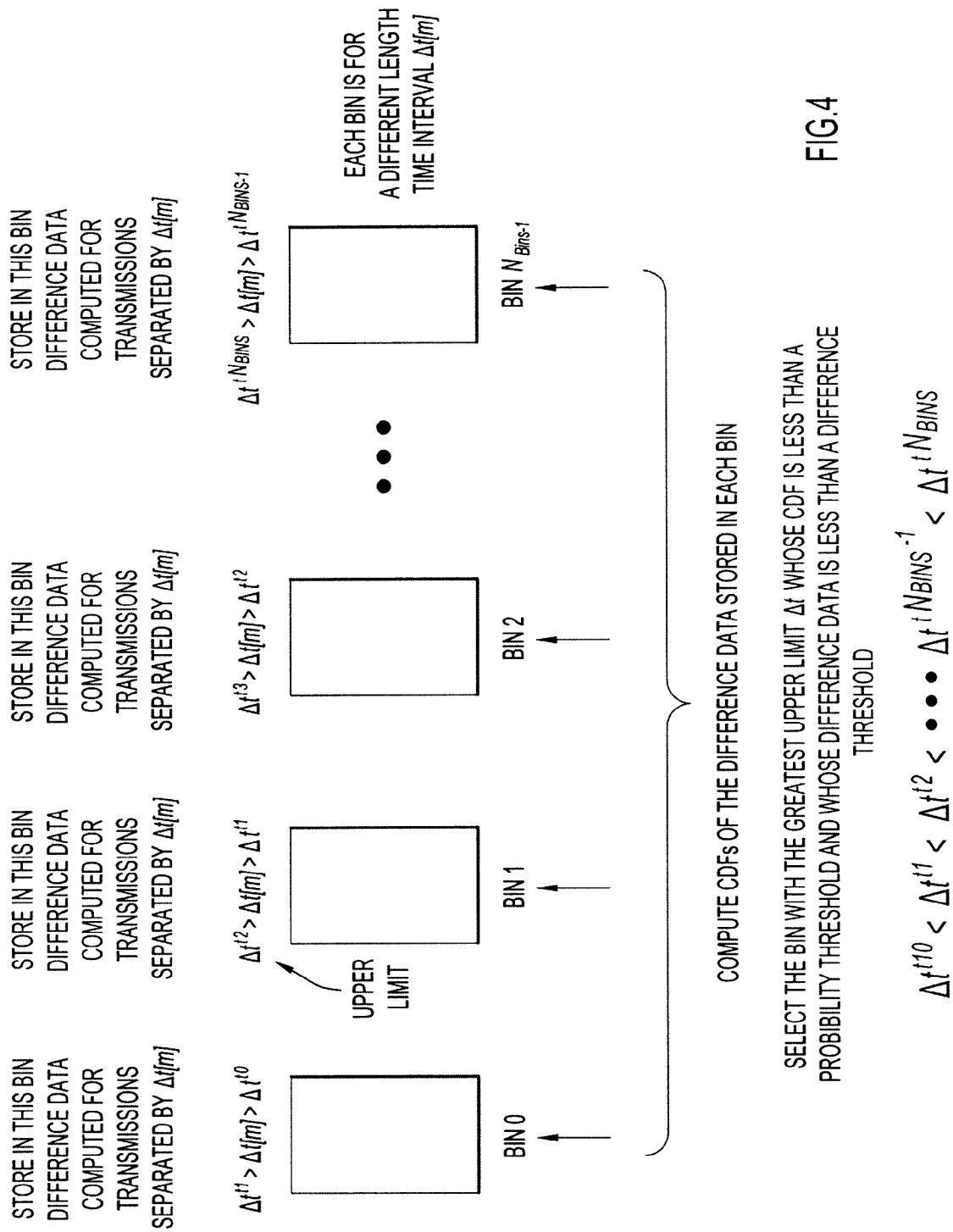
FIG. 4 is an example of a diagram showing bins used to store data generated during the channel coherence time estimation process.

Moreover, instead of generating the entire CDF (which would require varying the angle or distance threshold from 0 to some maximum for all bins), the operations at 150-180 may involve a more direct approach where the number of subcarriers of the channel observation parameter (co-phase angle or eigenvector) with a difference greater than or less than a threshold is determined for each delta-time bin (as depicted in FIG. 4). This data is analyzed to determine the intersection of the threshold difference (X) and the threshold (Z %) is determined. In other words, the percentage of cases for all delta-time bins where the difference (co-phase angle or Euclidean distance) is greater than or less than some threshold is determined. The bins with the differences greater than or less than the threshold are said to be within the coherence time, and of these bins, the bin with the longest coherence time (greatest upper time limit value) is selected as being the coherence time for the channel. Said another way, a comparison is made of the channel observation parameter computed for the plurality of transmissions at each subcarrier to accumulate a count of subcarriers at which the channel observation parameter differs by more than (or less than) a difference threshold. The one or more bins are identified for which the count of subcarriers is less than (or greater than) a count threshold. Of the bins for which the count of subcarriers is less than (or greater than) the count threshold, a selection is made of the bin associated with the longest time interval and the time interval (upper time limit value) of that (the selected) bin is used as the coherence time for the channel. The terms in the parentheses in this paragraph are meant to indicate that the same results may be achieved using an opposite comparision, i.e., "less than" instead of "greater than", or "greater than" instead of "less than".

Coherence time measurement from a channel observation parameter (co-phase angles or eigenvectors) is a useful measure of the "staticness" of the channel. The channel coherence time derived as described above may also be applied to set the bandwidth for closed loop rate selection. A highly responsive (wide bandwidth) rate-selection algorithm would be used for rapidly varying channel conditions, and a less responsive (low bandwidth) rate-selection algorithm used for relatively static channel conditions.

The coherence time estimation process described above in connection with FIGS. 3-6 is summarized as follows. At a first wireless communication device (e.g., AP), transmissions are received at a plurality of antennas from a second wireless communication device (e.g., CD). A corresponding plurality of antenna-specific receive signals is generated from each transmission received at the plurality of antennas. A channel estimate for a channel between the first wireless communication device and the second wireless communication device is computed from the antenna-specific receive signals. A channel observation parameter is computed from the channel estimate, where the channel observation parameter represents conditions of the channel at a time instance based on a received transmission. The channel observation parameter computed for each of a plurality of transmissions received over time is stored at the first wireless communication device. Data representing differences between the channel observation parameters stored for combinations of pairs of the plurality of transmissions received over time are computed. The data representing the differences are stored in bins sorted by time interval between time of reception of the pairs of transmissions used to compute the respective differences. An estimate of the coherence time of the channel is generated based on a distribution of the data representing the differences stored in the bins.

Similarly, an apparatus (e.g., an AP) is provided comprising a plurality of antennas, a radio receiver configured to be coupled to the plurality of antennas and to generate a plurality antenna-specific receive signals derived from transmissions sent by an other wireless communication device and detected at the plurality of antennas, and a controller coupled to the radio receiver. The controller is configured to generate from the plurality of antenna-specific receive signals a channel estimate for a channel with respect to the other wireless communication device, compute a channel observation parameter from the channel estimate, store the channel observation parameter computed for each of a plurality of transmissions received over time from the other wireless communication device, compute data representing differences between the channel observation parameters stored for combinations of pairs of the plurality of transmissions received over time, store the data representing the differences in bins sorted by time interval between time of reception of the pairs of transmissions used to compute the respective differences, and generate an estimate of the coherence time of the channel based on a distribution of the data representing the differences stored in the bins.

Further still, a computer-readable medium is provided, which computer-readable medium is encoded with instructions that, when executed by a processor, cause the processor to generate from a plurality of antenna-specific receive signals derived from a transmission received at a plurality of antennas of a first wireless communication (e.g., an AP) from a second wireless communication device (e.g., a CD), a channel estimate for a channel between the first wireless communication device and the second wireless communication device; compute a channel observation parameter from the channel estimate; store the channel observation parameter computed for each of a plurality of transmissions received over time at the first wireless communication device from the second wireless communication device; compute data representing differences between the channel observation parameters stored for combinations of pairs of the plurality of transmissions received over time; store the data representing the differences in bins sorted by time interval between time of reception of the pairs of transmissions used to compute the respective differences; and derive an estimate of the coherence time of the channel based on a distribution of the data representing the differences stored in the bins.

The Mobility Detection Process

In addition to channel coherence, which is an average rate of change of the wireless radio channel, sudden changes in the channel may be caused by device mobility or sudden movement of objects in the channel. The detection of such events in an efficient way may be used to trigger adjustments to the wireless link or update system parameters to achieve optimal performance. A beamforming system that is set for a slow update rate may be triggered to process channel state information when mobility is detected. Furthermore, the sustained update rate for a CD may be increased for the duration the CD is detected to be in motion or that objects in the environment are detected in motion. Likewise, the bandwidth of a rate-selection algorithm may be temporarily adjusted to rapidly adjust rates for a mobile CD and when mobility ceases the bandwidth may be reduced to be less susceptible to noise thus maintaining optimal performance at all times. Finally, mobility detection may be used to trigger a location solution update; unless mobility is detected location updates that require collecting data across multiple sensors can be avoided or reduced.

In the mobility detection process 200, the same channel observation parameter information (co-phase angle or vector Euclidean distance) and timestamps as described above in connection with FIG. 3 are captured upon receipt of each uplink transmission (packet or frame). The percentage of subcarriers with angle difference or Euclidean distance greater than some threshold $X_{Threshold}$ between beamforming information from subsequent or every N updates acts as the decision boundary for assessing mobility of a CD relative to the AP. The number of subcarriers that exhibit a change greater than some threshold are counted. If the number of subcarriers counted is greater than another threshold, the client is assumed to have moved between updates. If the number of subcarriers counted is less than that threshold, the client is determined to have been stationary between those updates.

If updates occur very frequently (so that multiple updates are likely to come while a client is in a given state—mobile or stationary), multiple updates can be used to converge on the mobility status rather than relying on two consecutive updates. This can be done by changing the status after P out of L updates has shown the status to have changed. In a variation, the change in the channel observation parameter (co-phase angle or Euclidean distance) measured between updates can be averaged or represented as a median, mode or percentile over some number of consecutive updates. That value can be used for each subcarrier when compared to the threshold. Multiple measurements can be processed by ignoring the subcarriers that showed a significant change between previous sets of consecutive measurements.

The process for mobility detection is similar to that for coherence time estimation. Consider the case of co-phase angle as in the explanation of the coherence time estimation algorithm. For stationary clients surrounded by mobile objects, there will be many subcarriers that have large differences between the co-phasing angles between successive updates, but many of the subcarriers will remain nearly the same. For mobile clients moving at a speed great enough to de-correlate channels between updates, substantially all sub-carriers will have changes to their co-phasing angles from one update to the next; however, some subcarriers will be relatively the same, on a random basis. Therefore, to detect mobility of CDs, the percentage of subcarriers that have co-phasing angles within some number of degrees, X, to the co-phasing angle of the previous update is evaluated.

Figure 7:
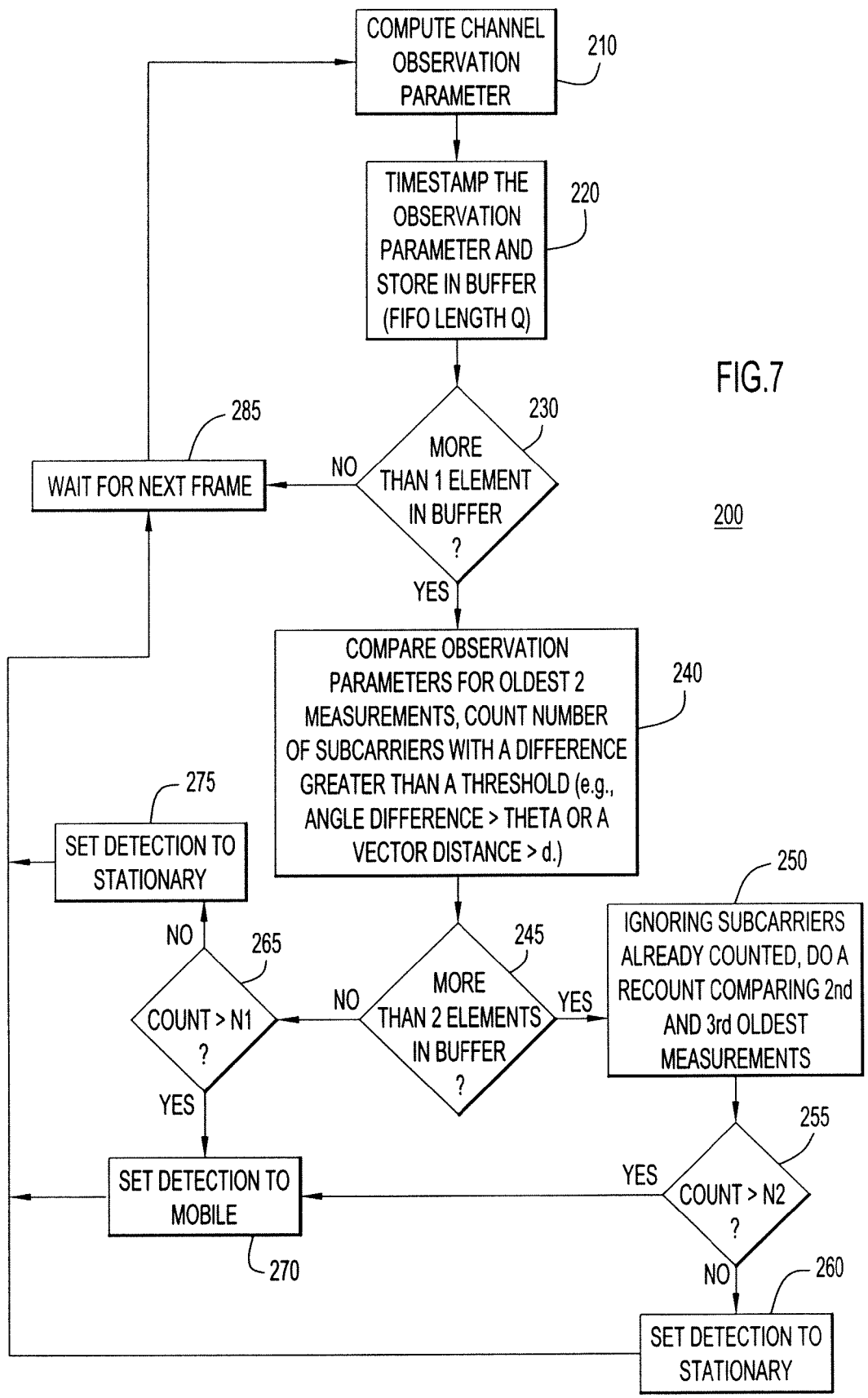
FIG. 7 is an example of a flow chart for the mobility detection process.

Reference is made now to the flow chart of FIG. 7 for a description of the mobility detection process logic 200. Operations 210 and 220 are similar to operations 110 and 120 in FIG. 3. At 210, with each received uplink transmission, a channel observation parameter is generated from the channel estimate matrix $\hat{H}$. The channel observation parameter comprises information, e.g., $\phi[n,k]$ or $J[n,k]$, as explained above where n is the sample time of arrival of the packet and k is the subcarrier index.

At 230, it is determined whether there is more than one element stored in the memory buffer 26. If not, then as shown at 285, the process goes back to operation 210. If there is more than one element in the memory buffer 26 (or a different buffer area in memory), then the process goes to operation 240. At operation 240, for the channel observation parameters for the oldest two measurements, the number of subcarriers with a difference greater than a threshold (e.g., angle difference>theta or a vector distance>d) are counted. Upon receipt of the next uplink packet, the memory buffer 26 stores $\phi[n,k]$ and $\phi[n+1,k]$. The difference or delta at a given subcarrier, for a co-phase angle channel observation parameter, is $\Delta\phi^{n,n+1}[k]=|\phi[n+1,k]-\phi[n,k]|$.

At 245, it is determined whether there are more than two elements in the memory buffer. If there are more than two elements in the memory buffer, then at 250, ignoring the subcarriers at which differences greater than a threshold were previously counted (at 240), a recount is made for different subcarriers that have a difference greater than a threshold for the most recent two channel observation measurement entries in the memory buffer. At operation 255, the count made at 250 with respect to subcarriers different from those evaluated at 240 is compared with a threshold (N2). When the count made at 255 is less than the threshold N2, then the mobility status of the CD is set to be "stationary" at 260. On the other hand, when the count made is greater than the threshold N2, then at 270, the mobility status of the CD is set to be "mobile", that is, the CD is moving relative to the AP.

When, at 245, the buffer is not storing more than two elements, then the process goes to 265 where the count made at 240 is compared with a threshold (N1). When the count made at 240 is greater than the threshold N1, at 270, the mobility status is set to "mobile". When the count made at 240 is greater than the threshold N1, at 275, the mobility status is set to "stationary".

The first subcarrier count threshold N1 used at 265 is different (less) than the second subcarrier count threshold N2 used at 255. The first subcarrier count threshold N1 is used when there are only two channel observation parameter samples (two received packets) used for the subcarrier count and the second subcarrier count threshold N2 is used when more than two channel observation parameter samples (more than two received packets) have been received, and the second and third oldest samples are used for the subcarrier difference comparison and count.

The logic behind the operations 240-265 in terms of the different count thresholds used at 255 and 265 can be summarized as follows. When a relatively small number of transmissions have been received, it is first determined whether the number of subcarriers determined to exhibit a difference greater than (or less than) the difference threshold is greater than (or less than) a first count threshold (N1). When a relatively large number of transmissions have been received, it is second determined whether a number of subcarriers, which are different than the subcarriers previously determined to exhibit a difference greater than (or less than) the difference threshold when a relatively small number transmissions have been received (at 240), that exhibit a difference greater than (or less than) the difference threshold is greater than (or less than) a second count threshold (N2). The terms in the parentheses in this paragraph are mean to indicate that the same results may be achieved using an opposite comparison, i.e., "less than" instead of "greater than", or "greater than" instead of "less than".

When the channel observation parameter is co-phase angle, the logic of operations 240-275 may be mathematically summarized as:

$$\rho = \frac{1}{K}\sum_{k=1}^{K}\Phi(\Delta\varphi^{n,n+1}[k]),$$

where $$\Phi(\Delta\varphi) = \begin{Bmatrix} 0, \Delta\varphi \leq \theta \\ 1, \Delta\varphi > \theta \end{Bmatrix},$$

$\theta$ is a phase angle threshold that can be calibrated, and $\rho$ is the percentage of subcarriers that had a co-phasing angle change greater than $\theta$. As $\rho$ approaches 1, it becomes more likely that the received uplink transmissions (packets) are from a CD that is moving relative to the AP.

Figure 8:
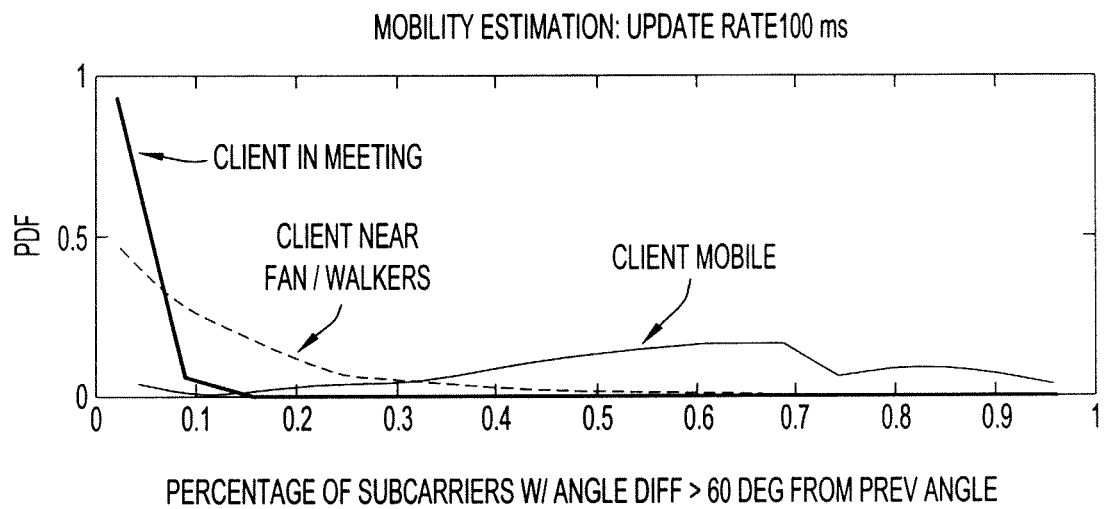
FIGS. 8 and 9 are diagrams illustrating examples of data generated from the mobility detection process.
Figure 9:
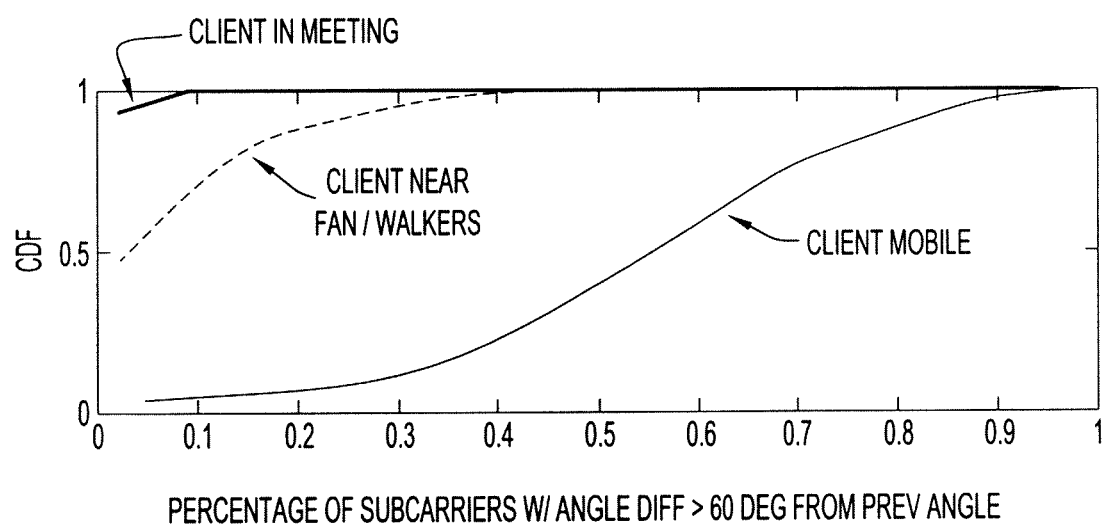

FIG. 8 shows the probability density function (PDF) of $\rho$ for both mobile and stationary CDs and FIG. 9 shows the CDF of $\rho$ for both mobile and stationary CDs. In FIG. 8, the co-phase angle difference threshold $\theta$=60 degrees. For a typical CD in an office environment, nearly all stationary clients will have a $\rho<0.1$, while nearly all mobile clients will have $\rho>0.1$. Therefore, a threshold for $\rho$ of 0.1 may be suitable to act as the decision boundary between mobile versus stationary estimation of a CD. This, however, may produce poor results in some environments. For example, when placing a stationary CD near moving metal objects (rotating fans) in a heavy foot traffic environment, the distributions overlap very narrowly and would only cause the CD to be falsely identified as mobile in 5% of cases and to be falsely identified as stationary in 10% of cases. In this case, the decision boundary for $\rho$ may be set to 0.3.

If the updates are arriving rapidly and more than two updates can be used for an estimation of the status of the CD, even more accurate results can be obtained. By removing the subcarriers with $\Phi(\Delta\phi^{n,n+1}(k))=1$ from consideration from all subsequent calculations of $\phi$, the stationary and mobile distributions diverge considerably, because stationary CDs tend to exhibit a large variance on the same group of subcarriers over time, while mobile clients exhibit a large variance on all subcarriers. This adjustment is reflected by the operations 245, 250 and 260 in the logic flow shown in FIG. 7.

Again, the foregoing mobility detection example uses co-phasing information. An eigenvector channel observation parameter may be used as well by replacing the difference in co-phase angles, $\phi[n,k]$, with the Euclidean distance $\Delta J[m]$ between eigenvectors $J[n,k]$ of the channel, and $\theta$ can be replace with a distance threshold d.

The mobility detection process depicted in FIGS. 7-9 may be summarized as follows. At a first wireless communication device (e.g., an AP), transmissions are received at a plurality of antennas transmissions in a channel from a second wireless communication device (e.g., a CD) to produce a corresponding plurality of antenna-specific receive signals. A channel estimate is computed from the plurality of antenna-specific receive signals for a channel between the first wireless communication device and the second wireless communication device. A channel observation parameter is computed from the channel estimate, the channel observation parameter representing conditions of the channel at a plurality of subcarriers at an instant of time based on a received transmission. Corresponding subcarriers of the channel observation parameter computed for successive transmissions are compared. An indication is generated as to whether the second wireless communication device is moving or stationary with respect to the first wireless communication device based on the number of subcarriers determined to exhibit a difference.

The number of subcarriers determined to exhibit a difference greater than (or less than) the difference threshold is compared with a count threshold. An indication that the second wireless communication device is stationary with respect to the first wireless communication device is made when the number of subcarriers that exhibit a difference greater than (or less than) the difference threshold is less than (or greater than) the count threshold. An indication that the second wireless communication device is moving with respect to the first wireless communication device is made when the number of subcarriers that exhibit a difference greater than (or less than) the difference threshold is greater than (or less than) the count threshold. The terms in the parentheses in this paragraph are meant to indicate that the same results may be achieved using an opposite comparision, i.e., "less than" instead of "greater than", or "greater than" instead of "less than".

Clock Synchronization Filtering Using Beamforming Information

In wireless clock synchronization, two devices exchange frames containing timing information. This timing information can be affected by the changes in the channel. It can be difficult to distinguish between actual clock changes that need to be captured or error in the measurements due to the channel that must be filtered out. By making coherence time measurements during this exchange, measured jumps in the clock values can be ignored if they occur between measurements within the coherence time of the channel. Furthermore, if the number of subcarriers exhibiting a change greater than some threshold (angle threshold or Euclidean distance threshold) exceeds a subcarrier count threshold, the jump in clock value can be attributed to the channel. This adjustment information can be fed back and used as input to a clock synchronization filter, e.g., block 16 shown in FIG. 1, to account for the jump. In sum, transmissions are received at a first wireless communication device, e.g., an AP, that contain timing information used by the first wireless communication device to synchronize a timing reference of the first wireless communication device with a timing reference of the second wireless communication device. The first wireless communication device ignores variations in the timing information when they are determined to occur between transmissions made within the coherence time of the channel. When the transmissions used to compute the data representing the differences (co-phase angles or eigenvectors), and the data representing the differences is determined to be greater than a threshold, adjustment information is supplied to a clock synchronization filter in the first wireless communication device to adjust the timing reference of the first wireless communication device.

The above description is intended by way of example only.

What is claimed is:

1. A method comprising:
   at a first wireless communication device, receiving, over a period of time, at a plurality of antennas transmissions in a channel from a second wireless communication device to produce a corresponding plurality of antenna-specific receive signals;
   computing from the plurality of antenna-specific receive signals a plurality of channel estimates for a channel between the first wireless communication device and the second wireless communication device;
   computing a channel observation parameter from each of the plurality of channel estimates, wherein the channel observation parameters represent conditions of the channel between the first wireless communication device and the second wireless communication device at a time instance;
   storing the channel observation parameters computed for each of the plurality of channel estimates at the first wireless communication device;
   determining combinations of the channel observation parameters;
   for each determined combination of channel observation parameters, computing data representing differences between the channel observation parameters in the respective combination;
   storing the data representing the differences in bins that each correspond to a range of time intervals, wherein the data representing the differences are each stored in a bin corresponding to a range of time intervals that encompasses the time interval between time of reception of the transmissions corresponding to the channel observations parameters used to compute the respective differences; and
   generating an estimate of the coherence time of the channel based on a distribution of the data representing the differences stored in the bins.

2. The method of claim 1, and further comprising generating data defining the bins such that each bin is dedicated to a different time interval length.

3. The method of claim 2, wherein generating the estimate of the coherence time of the channel comprises:
   computing a cumulative distribution function of the data representing the differences in each bin;
   identifying one or more bins having a cumulative distribution value that is less than a probability threshold and which stores difference data that is less than a channel observation threshold; and
   of the bins whose difference data are less than the threshold, selecting the bin associated with the longest time interval and setting the coherence time for the channel based on the time interval for the selected bin.

4. The method of claim 2, wherein computing the channel observation parameter comprises computing the channel observation value at each of a plurality of subcarriers, and wherein generating the estimate of the channel coherence time comprises:
   comparing the channel observation parameter computed for the plurality of transmissions at each subcarrier to accumulate a count of subcarriers at which the channel observation parameter differs by more than (or less than) a difference threshold;
   identifying the bins for which the count of subcarriers is less than (or greater than) a count threshold; and
   of the bins for which the count of subcarriers is less than (or greater than) the count threshold, selecting the bin associated with the longest time interval and using the time interval of that bin as the coherence time for the channel.

5. The method of claim 1, wherein computing the channel observation parameter comprises computing a co-phase angle at each of a plurality of subcarriers for each received transmission from the channel estimate computed for the received transmissions at each of the plurality of subcarriers, and computing data representing differences comprising computing data representing differences between co-phase angles computed for each of the plurality of transmissions.

6. The method of claim 1, wherein computing the channel observation parameter comprises computing an eigenvector at each of a plurality of subcarriers for each received transmission from the channel estimate computed from the received transmissions at each of the plurality of subcarriers, and computing data representing differences comprises computing data representing Euclidean distances between eigenvectors computed from reception of each of the plurality of transmissions.

7. The method of claim 1, wherein computing the channel observation parameter comprises computing a transmit beamforming vector at each of a plurality of subcarriers for each received transmission from the channel estimate computed from the received transmissions at each of the plurality of subcarriers, and computing data representing differences comprises computing data representing Euclidean distances between the transmit beamforming vectors computed from reception of each of the plurality of transmissions.

8. The method of claim 1, wherein receiving comprises receiving transmissions that contain timing information used by the first wireless communication device to synchronize a timing reference of the first wireless communication device with a timing reference of the second wireless communication device, and further comprising ignoring variations in the timing information when they are determined to occur between transmissions made within the coherence time of the channel.

9. The method of claim 8, and further comprising comparing the data representing the differences for reception of the transmissions containing timing information greater than a threshold, and when the data representing the differences for reception of the transmissions containing timing information is greater than the threshold, supplying adjustment information to a synchronization filter in the first wireless communication device.

10. An apparatus comprising.
  a plurality of antennas;
  a radio receiver configured to be coupled to the plurality of antennas and to generate a plurality of antenna-specific receive signals derived from a transmission sent by an other wireless communication device over a period of time and detected at the plurality of antennas;
  a controller coupled to the radio receiver and configured to:
    generate from the plurality of antenna-specific receive signals a plurality of channel estimates for a channel with respect to the other wireless communication device;
    compute a channel observation parameter from each of the channel estimates, wherein the channel observation parameters represent conditions of the channel with respect to the other wireless communication device at a time instance;
    store the channel observation parameters computed for each of the plurality of channel estimates;
    determine combinations of the channel observation parameters;
    for each determined combination of channel observation parameters, compute data representing differences between the channel observation parameters in the respective combination;
    store the data representing the differences in bins that each correspond to a range of time intervals, wherein the data representing the differences are each stored in a bin corresponding to a range of time intervals that encompasses the time interval between time of reception of the transmissions corresponding to the channel observations parameters used to compute the respective differences; and
    generate an estimate of the coherence time of the channel based on a distribution of the data representing the differences stored in the bins.

11. The apparatus of claim 10, wherein the controller is further configured to generate data defining the bins such that each bin is dedicated to a different time interval length.

12. The apparatus of claim 11, wherein the controller is configured to compute the channel observation parameter at each of a plurality of subcarriers, and to generate the estimate of the channel coherence time by comparing the channel observation parameter computed for the plurality of transmissions at each subcarrier to accumulate a count of subcarriers at which the channel observation parameter differs by more than (or less than) a difference threshold, identifying the bins for which the count of subcarriers is less than (or greater than) a count threshold, and of the bins for which the count of subcarriers is less than (or greater than) the count threshold, selecting the bin associated with the longest time interval and using the time interval of that bin as the coherence time for the channel.

13. The apparatus of claim 10, wherein the controller is configured to compute the channel observation parameter by computing a co-phase angle at each of a plurality of subcarriers for each received transmission from the channel estimate computed for the received transmissions at each of the plurality of subcarriers, and the controller is configured to compute the data representing differences by computing data representing differences between co-phase angles computed for each of the plurality of transmissions.

14. The apparatus of claim 10, wherein the controller is configured to compute the channel observation parameter by computing an eigenvector at each of a plurality of subcarriers for each received transmission from the channel estimate computed from the received transmissions at each of the plurality of subcarriers, and the controller is configured to compute the data representing differences by computing data representing Euclidean distances between eigenvectors computed from reception of each of the plurality of transmissions.

15. The apparatus of claim 10, wherein the controller is configured to compute the channel observation parameter by computing a transmit beamforming vector at each of a plurality of subcarriers for each received transmission from the channel estimate computed from the received transmissions at each of the plurality of subcarriers, and the controller is configured to compute the data representing differences by computing data representing Euclidean distances between the transmit beamforming vectors computed from reception of each of the plurality of transmissions.

16. A non-transitory computer-readable medium encoded with instructions that, when executed by a processor, cause the processor to:
  generate from a plurality of antenna-specific receive signals derived from a transmission received over a period of time at a plurality of antennas of a first wireless communication from a second wireless communication device, a plurality of channel estimates for a channel between the first wireless communication device and the second wireless communication device;
  compute a plurality of channel observation parameters from the channel estimates, wherein the channel observation parameters represent conditions of the channel between the first wireless communication device and the second wireless communication device at a time instance;

store the channel observation parameters computed for each of the plurality of channel estimates at the first wireless communication device;

determine combinations of the channel observation parameters;

for each determined combination of channel observation parameters, compute data representing differences between the channel observation parameters in the respective combination;

store the data representing the differences in bins that each correspond to a range of time intervals, wherein the data representing the differences are each stored in a bin corresponding to a range of time intervals that encompasses the time interval between time of reception of the transmissions corresponding to the channel observations parameters used to compute the respective differences; and generate an estimate of the coherence time of the channel based on a distribution of the data representing the differences stored in the bins.

17. The non-transitory computer-readable medium of claim 16, and further comprising instructions, that when executed by the processor, cause the processor to generate data defining the bins such that each bin is dedicated to a different time interval length, and wherein the instructions that cause the processor to compute the channel observation parameter comprise instructions that cause the processor to compute the channel observation parameter at each of a plurality of subcarriers, and wherein the instructions that cause the processor to generate the estimate of the coherence time of the channel comprise instructions that cause the processor to compare the channel observation parameter computed for the plurality of transmissions at each subcarrier to accumulate a count of subcarriers at which the channel observation parameter differs by more than (or less than) a difference threshold, identify the bins for which the count of subcarriers is less than (or greater than) a count threshold, and of the bins for which the count of subcarriers is less than (or greater than) the count threshold, select the bin associated with the longest time interval and using the time interval of that bin as the coherence time for the channel.

18. The non-transitory computer-readable medium of claim 16, wherein the instructions that cause the processor to compute the channel observation parameter comprise instructions that cause the processor to compute a co-phase angle at each of a plurality of subcarriers for each received transmission from the channel estimate computed for the received transmissions at each of the plurality of subcarriers, and the instructions that cause the processor to compute the data representing differences comprise instructions that cause the processor to compute data representing differences between co-phase angles computed for each of the plurality of transmissions.

19. The non-transitory computer-readable medium of claim 16, wherein instructions that cause the processor to compute the channel observation parameter comprise instructions that cause the processor to compute an eigenvector at each of a plurality of subcarriers for each received transmission from the channel estimate computed from the received transmissions at each of the plurality of subcarriers, and the instructions that cause the processor to compute the data representing differences comprise instructions that cause the processor to compute data representing Euclidean distances between eigenvectors computed from reception of each of the plurality of transmissions.

20. A method comprising:
at a first wireless communication device, receiving, over a period of time, at a plurality of antennas transmissions in a channel from a second wireless communication device to produce a corresponding plurality of antenna-specific receive signals;

computing from the plurality of antenna-specific receive signals a plurality of channel estimates for a channel between the first wireless communication device and the second wireless communication device;

computing a channel observation parameter from each of the channel estimates, wherein the channel observation parameters represent conditions of the channel at a plurality of subcarriers;

comparing corresponding subcarriers of the channel observation parameters computed for successive transmissions; and generating an indication as to whether the second wireless communication device is moving or stationary with respect to the first wireless communication device based on the number of subcarriers determined to exhibit a difference.

21. The method of claim 20, and further comprising comparing the number of subcarriers determined to exhibit a difference greater than (or less than) a difference threshold with a count threshold, and wherein generating comprises generating an indication that the second wireless communication device is stationary with respect to the first wireless communication device when the number of subcarriers that exhibit a difference greater than (or less than) the difference threshold is less than (or greater than) the count threshold, and generating an indication that the second wireless communication device is moving with respect to the first wireless communication device when the number of subcarriers that exhibit a difference greater than (or less than) the difference threshold is greater than (or less than) the count threshold.

22. The method of claim 21, wherein when a relatively small number of transmissions have been received, determining comprises first determining whether the number of subcarriers determined to exhibit a difference greater than (or less than) the difference threshold is greater than (or less than) a first count threshold, and when a relatively large number of transmissions have been received, determining comprises second determining whether a number of subcarriers, which are different than the subcarriers previously determined to exhibit a difference greater than (or less than) the difference threshold when a relatively small number transmissions have been received, that exhibit a difference greater than (or less than) the difference threshold is greater than (or less than) a second count threshold.

23. The method of claim 20, wherein computing the channel observation parameter comprises computing a co-phase angle at each of the plurality of subcarriers for each received transmission from the channel estimate computed for the received transmissions at each of the plurality of subcarriers.

24. The method of claim 20, wherein computing the channel observation parameter comprises computing an eigenvector at each of a plurality of subcarriers for each received transmission from the channel estimate computed from the received transmissions at each of the plurality of subcarriers.

25. The method of claim 20, wherein computing the channel observation parameter comprises computing a transmit beamforming vector at each of a plurality of subcarriers for each received transmission from the channel estimate computed from the received transmissions at each of the plurality of subcarriers.

\* \* \* \* \*